June 18, 1940.   E. KÜBLER   2,205,208
RECTIFIER SYSTEM
Filed March 21, 1939   2 Sheets-Sheet 1

WITNESSES:

INVENTOR
Erwin Kübler.
BY
ATTORNEY

Patented June 18, 1940

2,205,208

UNITED STATES PATENT OFFICE 2,205,208

RECTIFIER SYSTEM

Erwin Kübler, Berlin-Siemensstadt, Germany, assignor to Westinghouse Electric & Manufacturing Company, East Pittsburgh, Pa., a corporation of Pennsylvania Application March 21, 1939, Serial No. 263,145
In Germany March 22, 1938

6 Claims. (Cl. 175—363)

My invention relates to a rectifier system and particularly to rectifier plants having a terminal potential variable in steps by tap switching of the rectifier transformers.

Recently there has been a transition from rotary converters to vapor-electric converters for the supply of direct current power for electrolytic plants, for example, electrolytic baths for the production of aluminum, chlorine, etc.

In this transition, the operation of the baths and the dimensioning and the dividing up of the rectifier plant imposed requirements which are for most of the electrolytic plants about the same. In general, the bath operation requires a direct current power of the order of magnitude of 30,000 amperes at approximately 800 volts. For the purpose of adapting the potential to the number of baths connected in series, it must be regulable over very wide limits. If the potential regulation is to be carried out over the required wide limits, only through grid control of the rectifiers, there results on the three phase side too poor values of the power factor and this becomes the more important the more important the electrolytic plants are as the main load for the feeding polyphase network. It is, therefore, necessary to render the anode potential supplied to the rectifiers regulable by switching over on the transformers in steps.

In view of the high direct current power, it is further necessary to divide up the direct current power over a plurality of parallel operating rectifier groups and to which one or more rectifier groups are added as operating reserve. The operating phase number of the rectifier is preferably selected as high as possible to suppress, as far as possible, the generation of harmonic currents in the feeding three phase network. For this purpose, in general, a 12-phase supply is used for the rectifier.

The direct conversion of a 3-phase into a 12-phase system by a transformer requires, however, the use of zig-zag or fork connections of the transformer windings; in this case, it is no longer without difficulties possible to construct the transformer as tap transformer for the purpose of step regulation. The winding structure is consequently, because of the zig-zag or fork connections, so bothersome that the addition of tap conductors will introduce the greatest difficulties. It has heretofore been customary to solve the problem of step regulation with special regulating transformers which are connected in series with the main transformers. In this way, there naturally results an extraordinarily high use of transformers in the rectifier plant. The usual rectifier plants for electrolytic supply consists of six 12-phase rectifier vessels for the normal operation, each two of which are connected to a common transformer. Even for normal operation, there results, accordingly, three main transformers and three regulating transformers which, in general, are designed for a potential regulation in the limits of 50–100%. To this is added a fourth reserve group which also contains a main transformer and a regulating transformer.

The basic problem involved in the invention is to provide a rectifier plant for electrolytic purposes which shall fulfill the above propounded conditions, particularly also with reference to harmonic feedback to the polyphase network and the operating reserve with an essentially smaller use of transformers. In doing this, a rectifier plant with 12-phase feedback to the polyphase network which consists of an uneven number, preferably of three rectifier groups with separate feeding transformers for the normal operation and at least one reserve group, is made basic.

According to the invention, the feeding transformers of all of the groups in such plant are constructed as 6-phase tap transformers. In doing this, one driving group, as well as one reserve group, is rendered changeable to 12-phase operation by the connecting-in of cross transformers for +15° phase rotation, while the feeding transformers of the remaining operating groups are so designed that each two supplement each other to form a 12-phase system. By reason of the fact that the feeding transformers are only constructed 6-phase, it is possible to construct them with ordinary smooth windings, particularly also with tube windings, so that there is no longer any necessity to use particular additional regulating transformers. The expense in such a plan consists, accordingly, of four main transformers and two cross transformers which latter, however, need be designed only for a small fraction of the power. As compared with the above described plant with four 12-phase transformers and four regulating transformers, there results, accordingly, a considerably smaller expense. As will be shown further below the feedback to the polyphase network with reference to the harmonics is even more propitious since the plant in part feeds back in 24 phases.

Figure 1:
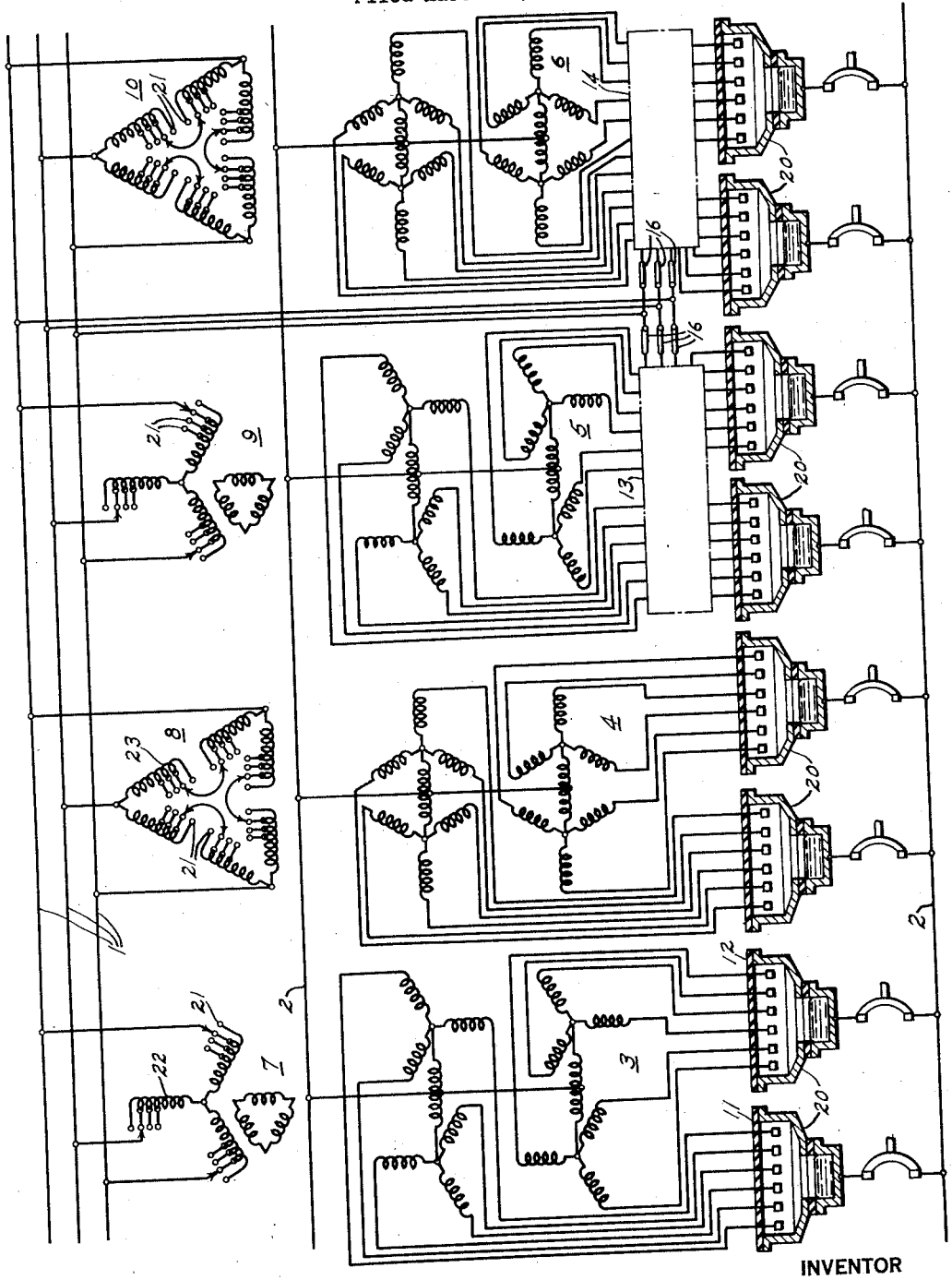
Figure 1 is a schematic illustration of a rectifier system according to my invention.
Figure 2:
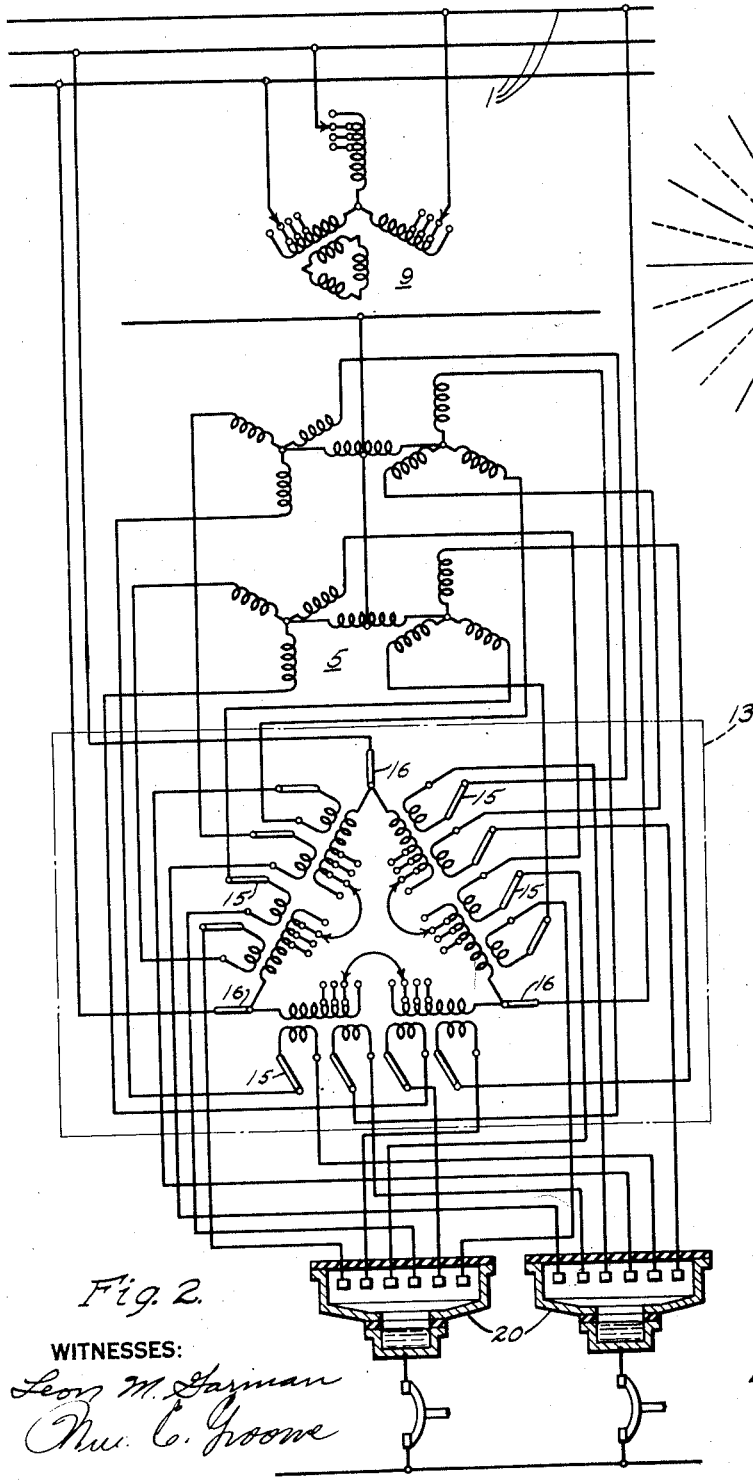
Fig. 2 is a similar illustration of a rectifier group comprising a disconnected transformer shown schematically in Fig. 1.

1 is the feeding 3-phase network and 2 the direct current network to which the electrolytic baths are connected. For the supply, three operating groups 3, 4 and 5 and one reserve group 6 are provided. All rectifier groups contain two discharge vessels 20 each, which are identified for the groups 3 by the numerals 11 and 12. Both vessels 20 of one group are supplied from a common feeding transformer. All of the feeding transformers 7, 8, 9 and 10 are constructed 6-phase with smooth windings, preferably tube windings, and with step or tap connections 21. The winding arrangements of the feeding transformers 7 and 8 of the two operating groups 3 and 4 is, in this respect, so selected that the two 6-phase transformers supplement themselves to form a 12-phase system. In the present case, this is attained by connecting the primary winding 22 of the transformer 7 in star and the spring winding 23 of the transformer 8, on the other hand, in delta. Thus there results between the secondary potential systems a phase displacement of 30°.

In series with the transformer 9 of the operating group 5 and the transformer 10 of the reserve group 6, a cross transformer 13 and 14, respectively, is connected to each; the cross transformer produces a phase rotation of ±15° and thus establishes from the 6-phase system of the main transformer a 12-phase system. In this aspect of the situation, it is no consequence whether the rectifier vessels are built 6-phase or 12-phase. In general, besides the connection of a plurality of anodes of one and the same vessel in parallel it is besides necessary for low phase numbers, so that in each case, one and the same type vessel may be used throughout for the whole plant.

The cross transformers 13 or 14 may be made inoperative by means of the switches 15 which bridge the secondary coils of the cross transformers, preferably the switches simultaneously open the coil connection and close a bridge circuit around the coil so that the terminal voltage of the transformers 9 or 10 are applied directly to the converter terminals. The switches 15 are preferably gang operated but such operation is in no way necessary. The primary connection to the cross transformers 13 and 14 is preferably controlled by suitable switches 16 which may be connected in gang with the switches 15.

In normal operation, the switches 15 will not be operated under load so simple disconnecting switches may be utilized. Accordingly, with the aid of these switching devices, the groups 5 and 6 of the 6-phase operation may be converted into 12-phase operation. It is further to be noted that the 6-phase system of the two transformers 9 and 10 with which are associated the cross transformers 13 and 14 are displaced in phase with reference to each other by 30° by corresponding winding connection.

If the normal operation in which, accordingly, the reserve groups 6 are not connected, is first observed, it is recognized that the two groups 3 and 4 together exert a 12-phase feedback action and that the group 5 regarded by itself, acts also as a 12-phase system. If the operating group 4 drops out, its replacement by the reserve group 6 is, without more, possible by bridging the cross transformer in the last-named group. If, on the other hand, the group 3 drops out, a direct replacement by the group 6 is not possible since both groups have different types of primary windings. In such a case, the cross transformer 13 of the operating group 5 is bridged so that it acts in the same manner as the operating group 3 acted heretofore, the reserve group 6 taking over the previous roll of the operating group 5. The operating group 5 is further, at its dropping out without more, replaceable by the reserve group 6 since, in this case, by reason of the 12-phase effect, the phase rotation of 30° between the two groups plays no roll. It is, accordingly, seen that it is possible in any kind of a disturbance case to reproduce the original switching combination.

Figure 3:
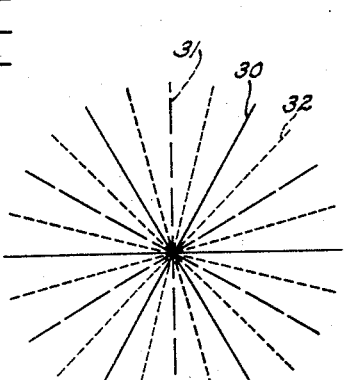
Fig. 3 is a diagrammatic illustration of the voltage phase displacements.

To obtain a picture as to how the whole rectifier system reacts on the polyphase network, start, for example, with the operating group 3. The secondary phases of this group are displaced with reference to each other by 60°. This group has, accordingly, phases with the phase positions 0°, 60°, 120°, 180°, etc., as represented by the solid lines 30 of Fig. 3. In-between, i. e., at 30°, 90°, 150°, etc., the phases of the operating group 4 lie, as represented by the broken lines 31 of Fig. 3. The phases of the operating group 5 are displaced with reference to each other by only 30° and lie, because of the equally large forward and backward rotation of the cross transformers, symmetrically to the phase of the operating group 3. Accordingly, they take on the positions 15°, 45°, 75°, 105°, etc., as represented by the dotted lines 32 of Fig. 3. The phases of the operating groups 3, 4 and 5 together supplement themselves mutually to form a 24-phase system. This is, however, only partially the case, since phase power of the operating group 5 is half as large as the phase power of the two other operating groups. Altogether there results a 24-phase feedback action for ⅔ of the whole power, while a third of the power acts back on the network as a 12-phase system.

I claim as my invention:

1. A rectifier plant regulable by step connection, particularly with 12-phase feedback action on the polyphase network consisting of an uneven number, preferably three rectifier groups with separate feeding transformers for normal operation and at least one reserve group, characterized by the fact that the feeding transformers of all of the groups are formed as 6-phase tap transformers and a cross-transformer connected in series with one operating group, as well as one reserve group, the windings of the cross-transformers changing the phase of the terminal voltage by ±15° phase rotation to 12-phase operation, while of the feeding transformers of the remaining operating groups, each two supplements themselves to form a 12-phase system.

2. A rectifier plant, according to claim 1, characterized by the fact that the 6-phase potential system of the reserve group and the operating group, which are equipped with cross transformers, are displaced by 30° in phase with reference to each other.

3. A rectifier system comprising a plurality of groups of rectifiers, transformer means for supplying each group of rectifiers said transformer means having alternately star and delta connected secondary and star connected secondaries whereby phase potentials of the alternate transformers are shifted in phase with respect to each other, and an auxiliary transformer connected in series with one of said rectifier groups for further shifting the phase of the potential applied to one group of rectifiers.

4. A conversion system comprising an uneven number of parallel operating converter groups connected between a three-phase circuit and a direct-current circuit, a feeding transformer for each of said converter groups, said feeding transformers having alternate star and delta connected primaries and multiple star secondaries whereby the phase potentials of alternate groups are shifted 30° in phase with respect to each other to produce a twelve-phase arrangement, a cross-transformer connected in series with the secondary winding of the odd group of the parallel operating groups, the secondary windings of said cross-transformer displacing the phase position of the terminal voltage of the feeding transformer 15° forward for half of the group and 15° reverse for the other half of the group to produce a twelve-phase arrangement for the group, said twelve-phase arrangement being displaced 15° from the first-mentioned twelve-phase arrangement.

5. A conversion system comprising three parallel operating conversion groups connected between a polyphase alternating-current circuit and a direct-current circuit each of said groups including two multi-valve converters, a feeding transformer having taped primary windings to provide voltage regulation for said converters, and substantially independent secondary windings connected respectively to said converters, two of said parallel groups having dissimilar primary connections whereby the terminal voltage of the respective transformers is displaced in phase so that the combined terminal voltages provide a multiplied phase arrangement with respect to the alternating-current system, a cross-transformer connected in series with the feeding transformer of the third parallel operating group, the secondary windings of said cross-transformer being connected zigzag with respect to the secondary windings of the feeding transformer for producing a multiplied phase pattern equal in phase number to the phase pattern produced by the two first-described groups, said phase patterns being shifted with respect to each other.

6. A conversion system comprising three parallel operating conversion groups connected between a polyphase alternating-current circuit and a direct-current circuit each of said groups including two multi-valve converters, a feeding transformer having taped primary windings to provide voltage regulation for said converters, and substantially independent secondary windings connected respectively to said converters, two of said parallel groups having dissimilar primary connections whereby the terminal voltage of the respective transformers is displaced in phase so that the combined terminal voltages provide a multiplied phase arrangement with respect to the alternating-current system, a cross-transformer connected in series with the feeding transformer of the third parallel operating group, the secondary windings of said cross-transformer being connected zigzag with respect to the secondary windings of the feeding transformer for producing a multiplied phase pattern equal in phase number to the phase pattern produced by the two first-described groups, said phase patterns being shifted with respect to each other, and switching means for rendering said cross-transformer inactive so that said third group may replace one of the other groups.

ERWIN KÜBLER.